US007193381B2

(12) United States Patent
Ford et al.

(10) Patent No.: US 7,193,381 B2
(45) Date of Patent: Mar. 20, 2007

(54) ELECTRIC JACK GROUND CONTACT DETECTION METHOD AND DEVICE

(75) Inventors: Robert M. Ford, Troy, MI (US); John P. Manfreda, Sterling Heights, MI (US); Mark J. Woloszyk, Sterling Heights, MI (US); Shawn P. Haley, West Bloomfield, MI (US)

(73) Assignee: Innovative Design Solutions, Troy, MI (US)

( * ) Notice: Subject to any disclaimer, the term of this patent is extended or adjusted under 35 U.S.C. 154(b) by 0 days.

(21) Appl. No.: 11/243,253

(22) Filed: Oct. 4, 2005

(65) Prior Publication Data

US 2006/0084308 A1 Apr. 20, 2006

Related U.S. Application Data

(60) Provisional application No. 60/619,768, filed on Oct. 18, 2004.

(51) Int. Cl.
*H02P 7/00* (2006.01)

(52) U.S. Cl. ...................... 318/432; 318/433; 318/436; 254/418; 254/424

(58) Field of Classification Search ................ 318/432, 318/433, 434, 436, 568.1; 280/6.156, 6.153; 254/418, 424
See application file for complete search history.

(56) References Cited

U.S. PATENT DOCUMENTS 3,606,247 A 9/1971 Liston
3,943,637 A 3/1976 Hanser
4,061,309 A 12/1977 Hanser
4,084,830 A * 4/1978 Daniel et al. ............... 254/424
4,148,125 A 4/1979 Hanser
4,165,861 A 8/1979 Hanser
4,380,258 A 4/1983 Hanser
4,467,250 A * 8/1984 Thomasson ................. 318/436
4,597,584 A 7/1986 Hanser
4,655,269 A 4/1987 Hanser et al.
4,743,037 A 5/1988 Hanser
4,746,133 A 5/1988 Hanser et al.
4,807,767 A * 2/1989 Kornely ...................... 212/278
5,143,386 A * 9/1992 Uriarte ....................... 254/418
5,176,391 A 1/1993 Schneider et al.
5,188,379 A 2/1993 Krause et al.
5,511,459 A 4/1996 Hanser et al.
5,547,040 A 8/1996 Hanser et al.
5,628,521 A 5/1997 Schneider et al.

(Continued)

*Primary Examiner*—Paul Ip
(74) *Attorney, Agent, or Firm*—Reising, Ethington, Barnes, Kisselle, P.C.

(57) ABSTRACT

An electric jack ground contact detection method and device for detecting ground contact of an electric motor-driven jack as the jack is being extended to adjust the attitude of a mobile platform. The device includes a controller that monitors the electrical power draw of an electric motor-driven jack while the jack is being extended for use in adjusting the attitude of a mobile platform. The controller recognizes jack ground contact when the monitored power draw value exceeds a ground contact power draw value consistent with jack ground contact. The controller calculates the ground contact power draw value as equaling the sum of a dynamically-adjusted threshold power draw value associated with jack extension before ground contact and a power draw increase value equaling an amount of additional power that the jack is known to draw as a result of jack ground contact.

15 Claims, 3 Drawing Sheets

U.S. PATENT DOCUMENTS

| | | | | |
|---|---|---|---|---|
| 5,656,903 | A * | 8/1997 | Shui et al. | 318/568.1 |
| 5,676,385 | A | 10/1997 | Schneider et al. | |
| 5,772,270 | A | 6/1998 | Hanser et al. | |
| 5,890,721 | A | 4/1999 | Schneider et al. | |
| 5,901,969 | A | 5/1999 | Schneider et al. | |
| 5,908,215 | A | 6/1999 | Hanser et al. | |
| 5,913,525 | A | 6/1999 | Schneider et al. | |
| 6,050,573 | A | 4/2000 | Kunz | |
| 6,684,623 | B2 * | 2/2004 | Langston et al. | 60/226.2 |
| 6,948,722 | B2 * | 9/2005 | Sproatt et al. | 280/6.153 |
| 7,025,178 | B2 * | 4/2006 | Wengelski et al. | 187/277 |
| 7,091,683 | B1 * | 8/2006 | Smith et al. | 318/432 |
| 2003/0015982 | A1 * | 1/2003 | Cox-Smith et al. | 318/433 |
| 2004/0046337 | A1 * | 3/2004 | Sproatt et al. | 280/6.156 |
| 2004/0155622 | A1 * | 8/2004 | Mayhew et al. | 318/778 |
| 2005/0237802 | A1 * | 10/2005 | Santero et al. | 365/185.11 |

* cited by examiner

ELECTRIC JACK GROUND CONTACT DETECTION METHOD AND DEVICE

CROSS-REFERENCES TO RELATED APPLICATIONS

This application claims priority from Provisional Application No. 60/619,768, filed Oct. 18, 2004 and entitled "Positioning Device for Mobile Platforms Having DC Electric Jacks".

STATEMENT REGARDING FEDERALLY SPONSORED RESEARCH OR DEVELOPMENT

Not Applicable

BACKGROUND OF THE INVENTION

1. Field of the Invention

This invention relates generally to a method and device for detecting ground contact of an electric motor-driven jack as the jack is being extended to adjust the attitude of a mobile platform.

2. Description of the Related Art Including Information Disclosed Under 37 CFR 1.97 and 1.98

Any mobile platform attitude adjustment system that relies on jacks to move a platform into a desired attitude must have a jack drive mechanism for extending the jacks to the ground, adjusting the attitude of the platform, and retracting the jacks when the platform is to be moved to a different location. It is desirable for the jacks to be firmly seated on the ground before allowing such a jack drive mechanism to lift or adjust the attitude of the platform since failure to properly seat the jacks on the ground can result in unstable and potentially dangerous platform positions or attitudes.

It is also desirable that a controller for controlling such a jack drive mechanism have a feedback mechanism that allows the controller to determine when jacks contact the ground. Such a controller determines when jacks are on the ground to ensure that the platform is firmly seated to prevent the jack drive mechanism from significantly elevating any portion of the platform until after all the jacks have been seated or grounded.

For example, U.S. Pat. No. 5,143,386 issued 1 Sep. 1992, to Uriarte, discloses a platform leveling device including a plurality of jacks powered by respective DC electric jack motors. To detect ground contact the Uriarte patent discloses a controller programmed to interpret electrical motor current draw values exceeding a fixed, predetermined current value, as indicating jack ground contact. However, the Uriarte device is unable to recognize and ignore current spikes that exceed the predetermined current value but are unrelated to jack ground contact. Current spikes unrelated to jack ground contact may be caused by such phenomena as motor in-rush, momentary contact with intervening obstructions, impurities in the jack drive mechanism, and clutching. Neither does Uriarte disclose compensation for variations in jack motor power draw.

Variations in jack power draw can occur for a number of different reasons: As a jack ages, wear on its mechanical parts increases, requiring the motor driving the jack to work progressively harder to lift the same load. Other factors include expansion and contraction due to temperature changes, contamination, loss of lubrication, corrosion, and the like. Jack power draw can also vary depending on which portion of a platform the jack is supporting and the location and starting attitude of the platform relative to the ground. The starting attitude relative to the ground can vary greatly between leveling locations and, when it does, it causes the jacks supporting the platform to contact the ground at different times and to divide the load differently. The jack or jacks bearing more load will work harder and draw more power than the others. Jack power draw can also be affected by changes in the amount of peak power available from a battery or batteries that power the motor driving the jack.

U.S. Pat. No. 4,084,830 issued 18 Apr. 1978, to Daniel, Jr. et al., discloses, for each electric jack in a platform leveling system, a ground contact detection switch mounted in a position to be mechanically closed by a pin that is supported in such a way as to move upward into contact with the switch when an associated jack extends into contact with the ground. A controller is connected in an electrical ground contact detection circuit with each ground contact detection switch and is programmed to interpret a closed ground contact detection circuit as indicating that a corresponding jack has contacted the ground. The controller is further programmed to interpret an open ground contact detection circuit as indicating that a corresponding jack is not contacting the ground.

What is needed is an electric jack ground contact detection method and device that can detect jack ground contact by sensing power draw increases rather than requiring mechanically-actuated switches, that can recognize and ignore current spikes that are unrelated to jack ground contact, and that can compensate for variations in jack motor power draw.

BRIEF SUMMARY OF THE INVENTION

According to the invention, an electric jack ground contact detection device is provided for detecting ground contact of an electric motor-driven jack as the jack is being extended to adjust the attitude of a mobile platform. The device includes a controller configured to monitor the electrical power draw of an electric motor-driven jack while the jack is being extended for use in adjusting the attitude of a mobile platform. The controller is further configured to recognize jack ground contact when the monitored power draw value exceeds a ground contact power draw value consistent with jack ground contact. Still further, the controller is configured to calculate the ground contact power draw value as equaling the sum of a dynamically-adjusted threshold power draw value associated with jack extension before ground contact and a power draw increase value equaling an amount of additional power that the jack is known to draw as a result of jack ground contact. Dynamic adjustment of the threshold power draw value allows the device to compensate for variations in jack power draw that occur during each jack extension and also for variations in jack power draw that occur over time due to wear and that change between uses due to variations in environmental conditions.

According to another aspect of the invention, an electric jack ground contact detection device is provided that includes a controller configured to monitor the electrical power draw of an electric motor-driven jack while the jack is being extended for use in adjusting the attitude of a mobile platform. The controller is further configured to recognize jack ground contact only after the monitored power draw value has exceeded a ground contact power draw value consistent with jack ground contact for a predetermined period. This causes the controller to ignore power spikes unrelated to ground contact.

The invention also includes a method for detecting ground contact of an electric motor-driven jack. According to this method, ground contact of an electric motor-driven jack can be detected by predetermining and storing a ground contact power draw value known to be generally equal to the power draw of the jack once the jack has contacted the ground while extending to adjust the attitude of the platform, monitoring a present electrical power draw value of the jack while the jack is extending to adjust the attitude of the mobile platform, comparing the present jack power draw value to the stored ground contact power draw value while the jack is extending, and then recognizing ground contact of the jack as occurring when the present jack power draw value equals or exceeds the stored ground contact power draw value. According to this method the stored ground contact power draw value is calculated by predetermining a threshold power draw value of the electric jack motor known to result from extension of the jack without encountering an obstruction, predetermining a power draw increase value of the jack known to result from ground contact of the jack, then adding the power draw increase value to the threshold power draw value.

BRIEF DESCRIPTION OF THE SEVERAL VIEWS OF THE DRAWINGS

These and other features and advantages of the invention will become apparent to those skilled in the art in connection with the following detailed description and drawings, in which.

DETAILED DESCRIPTION OF INVENTION EMBODIMENT(S)

Figure 1:
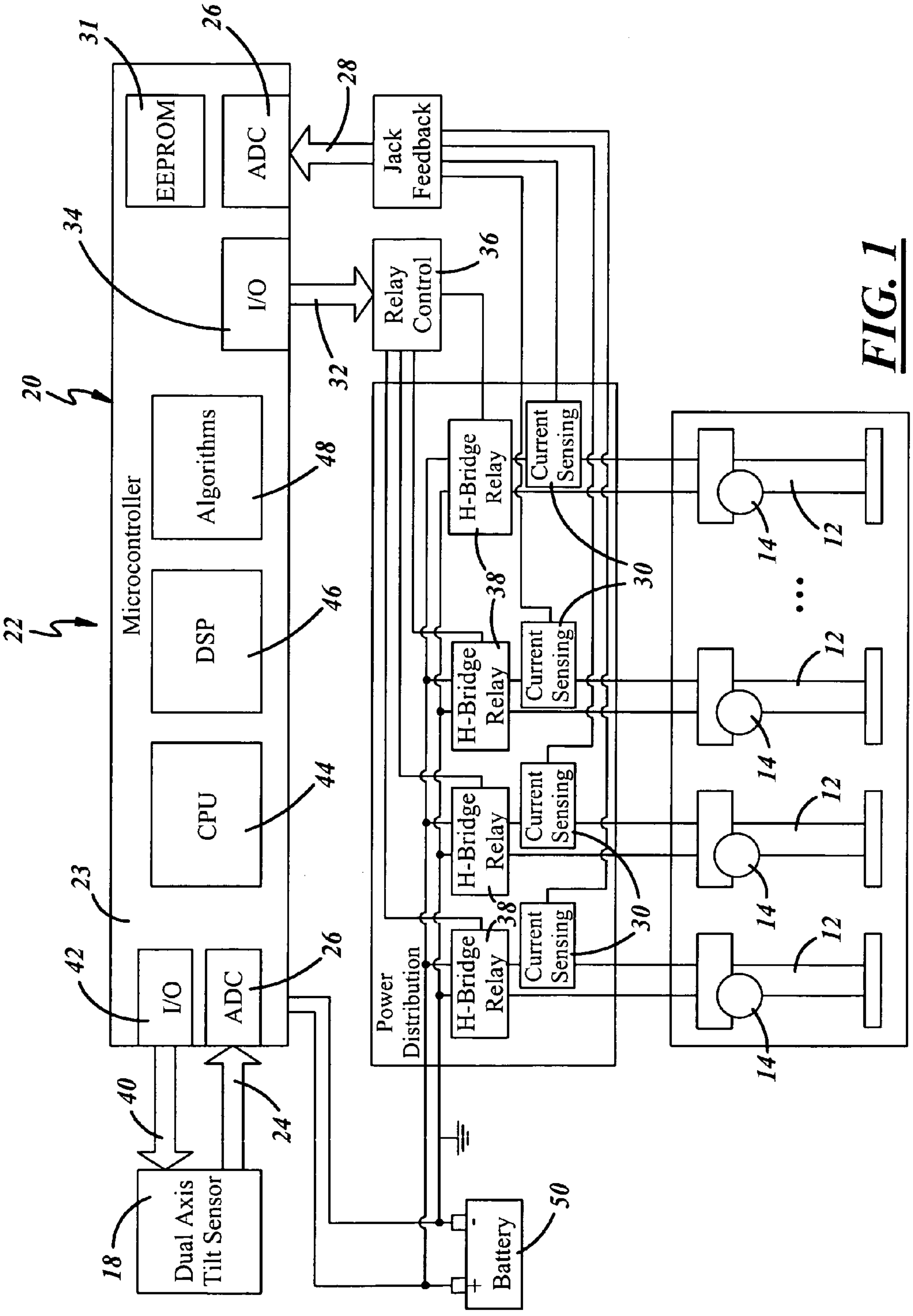
FIG. 1 is a schematic block diagram of a mobile platform attitude adjustment device constructed according to the invention.
Figure 2:
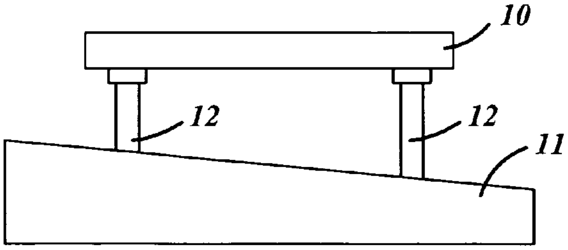
FIG. 2 is a schematic front view of a pair of jacks supporting a platform over ground.
Figure 3:
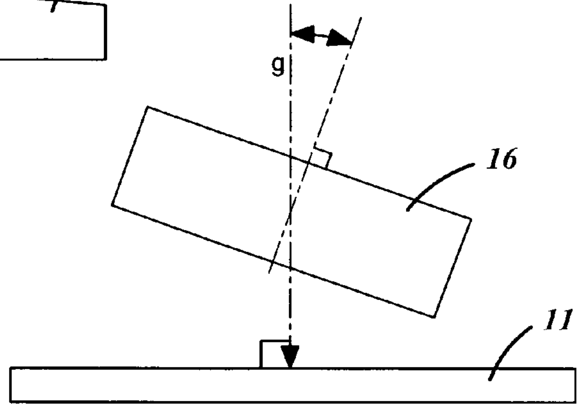
FIG. 3 is a schematic front view of a tilt sensor shown tilted relative to earth gravity.
Figure 4:
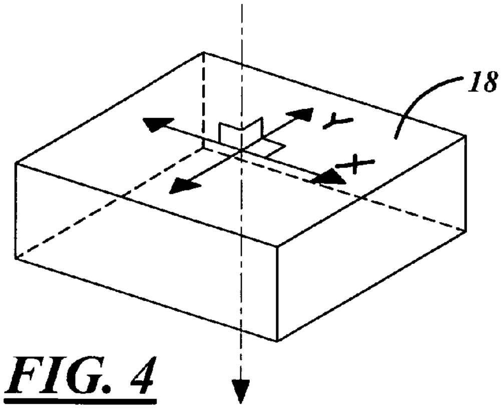
FIG. 4 is a schematic orthogonal view of the dual-axis tilt sensor of FIG. 3 showing coordinate axes relative to earth gravity.
Figure 5:
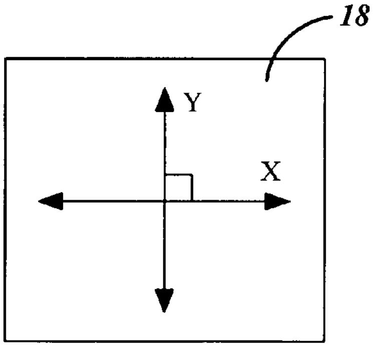
FIG. 5 is a schematic top view of the dual-axis tilt sensor of FIG. 3 showing coordinate axes relative to earth gravity.
Figure 6:
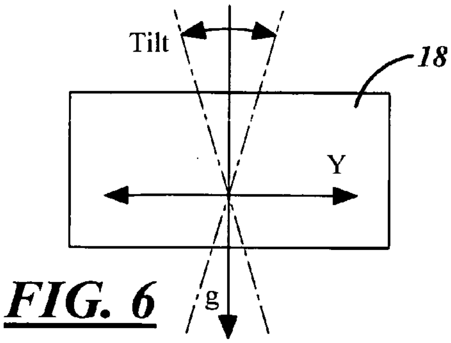
FIG. 6 is a schematic front view of the dual-axis tilt sensor of FIG. 3 showing coordinate axes relative to earth gravity.
Figure 7:
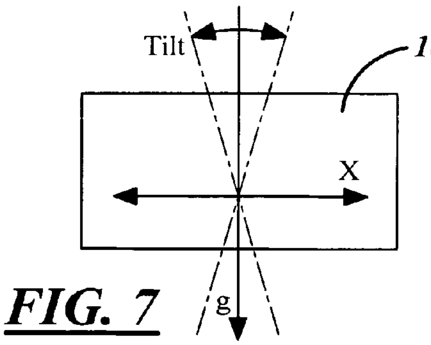
FIG. 7 is a schematic side views of the dual-axis tilt sensor of FIG. 3 showing coordinate axes relative to earth gravity.

In this document the term "platform" refers to a body, such as the one shown at 10 in FIG. 2, which is to be raised relative to the ground 11 and its attitude adjusted in preparation for performing some operation or for accommodating certain activities to be carried out on the platform. The term "jack" refers to a mechanism for raising heavy objects by means of force applied with a lever, screw, or press. In this paper, the jacks, as shown at 12 in FIGS. 1 and 2, are of a type driven by motors 14 powered by direct electrical current (DC electrical power) as shown in FIG. 1. The term "tilt sensor" refers to a sensor, such as the sensor shown at 16 in FIG. 3, that's designed to detect the angle of tilt between a vertical axis through the sensor 16 and Earth gravity. The term "dual axis tilt sensor" refers to a tilt sensor capable of detecting the angle between the sensor and the Earth's gravity in two axes, each perpendicular to the other. In FIGS. 4–7 a dual axis tilt sensor is shown at 18.

A device for detecting ground contact of an electric motor-driven jack 12 as the jack is being extended to adjust the attitude of a mobile platform 10 is generally shown at 20 in FIG. 1. The device 20 is incorporated in a mobile platform attitude adjustment system 22 that is, in turn, mountable to a mobile platform 10 whose attitude is to be adjusted. As shown in FIG. 1 the device 20 is electrically connected to each of several motor-driven jacks 12 mounted at spaced locations around the mobile platform 10 whose attitude is to be adjusted.

The device 20 includes a controller 23 that is also the controller for the platform attitude adjustment system 22. In other words, ground contact detection is a function of the platform attitude adjustment system 22 that allows the platform attitude adjustment system 22 to ground each of the jacks 12 before beginning to adjust platform attitude. Details relating to the construction and operation of a platform attitude adjustment device employing such a controller can be found in U.S. Pat. No. 6,584,385, which issued 24 Jun. 2003 to Ford et al., and U.S. patent application Ser. No. 10/318,820 (published as 20030135312), both of which are assigned to the assignee of the present invention, and are incorporated herein by reference.

As shown in FIG. 1, the controller 23 receives signals 24 representing platform attitude from the dual-axis tilt sensor 18 through an analog-to-digital converter 26. The controller 23 also receives feedback signals 28 from each of a plurality of jacks 12 from current sensors 30 through the analog-to-digital converter 26. While FIG. 1 shows two ADC blocks, it's understood that the device 20 may use either two analog-to-digital converters or single analog-to-digital converter including an ADC conversion circuit capable of individually converting signals from different signal sources, e.g., by internally multiplexing signals received via a plurality of channels.

The controller 23 is capable of sending control signals 32 to the jacks 12 through a first I/O port 34, a relay control 36, and respective H-bridge relays 38. The controller 23 is also capable of sending control signals 40 to the dual-axis tilt sensor 18 through a second I/O port 42. The controller 23 includes a central processing unit 44, a software-implemented digital signal processor 46, and control algorithms 48. A battery 50 provides electrical power to the jacks 12 through the H-bridge relays 38 as well as to the controller 23.

The controller 23 is programmed to monitor the electrical power draw (P) of an electric motor-driven jack 12 while the jack 12 is being extended for use in adjusting the attitude of a mobile platform 10. The electrical power draw (P) of an electric motor-driven jack during unloaded operation is represented by the generally level line generally indicated at $P_{uo}$ in FIG. 8.

Figure 8:
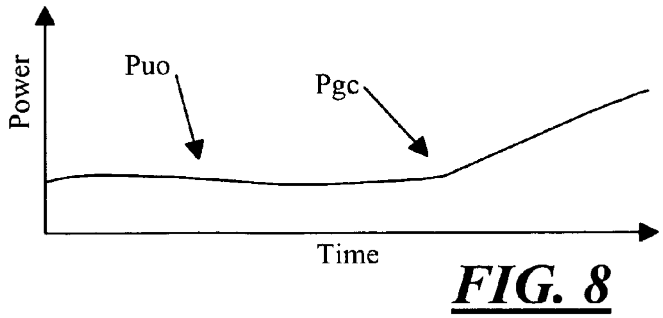
FIG. 8 is a graph depicting the power draw curve of a DC electric motor over time, leading from unloaded operation through the point of jack ground contact and into a period of load transfer onto the grounded jack.

The controller 23 is programmed to recognize jack ground contact as having occurred when the monitored power draw value (P) of one of the jacks 12 exceeds a ground contact power draw value ($P_{gc}$) known to be consistent with that particular type of jack having experienced ground contact. The ground contact power draw value of a jack 12, shown at $P_{gc}$ in FIG. 8, is predetermined to be a value known to be generally equal to the power draw of an electric jack motor

14 driving the jack 12 at the time that that electric jack motor 14 has driven an extendable foot portion 30 of the jack 12 into contact with the ground in the process of extending the jack 12 to adjust the attitude of the mobile platform 10. As is also shown in FIG. 8, the power draw value of the jack then continues to increase past $P_{gc}$ as platform load is transferred onto the jack.

The controller 23 calculates the ground contact power draw value ($P_{gc}$) of a jack 12 as equaling the sum of a dynamically-adjusted no-load threshold or "baseline" power draw value ($P_{threshold}$) of the jack 12 and a power draw increase value or "delta" value ($\Delta P_{load}$) associated with the jack type, or, $P_{gc}=P_{threshold}+\Delta P_{load}$. The no-load threshold power draw value ($P_{threshold}$) is the maximum "unloaded" power draw ($P_{uo}$) known to result from extension of an extendable foot portion 30 of the jack 12 without the foot portion 30 encountering the ground or any other obstruction. The power draw increase value or "delta" value ($\Delta P_{load}$) is an amount of additional power draw known to result from ground contact of the extendable foot portion 30 of the jack 12. The parameter is unique to each target application, and is measured over a suitably large sample of motors and jacks in a target application by measuring the power delta value ($\Delta P_{load}$) of each of the jacks 12 in the sample when its extendable foot portion 30 contacts the ground and platform 10 weight begins to transfer to each jack 12. Dynamic adjustment of the threshold power draw value ($P_{threshold}$) allows the device 20 to compensate for variations (particularly reductions) in jack power draw that occur during each jack extension, that occur over time due to such factors as jack wear, and also for variations in jack power draw that occur between uses due to variations in environmental conditions.

For the power draw increase or "delta" value ($\Delta P_{load}$) the controller 23 is programmed to use a value representing the smallest amount of additional power that the type of jack to be used in a given application is known to draw as a result of ground contact of the extendable foot portion 30 of a jack 12. The value is determined by measuring the smallest amount of power draw increase experienced by a sample poll of jacks at ground contact. The parameter is set slightly smaller than this worst case measured value to insure that the controller 23 will be able to detect ground contact for jack motors 14 whose power draw increase may fall outside the range of values obtained in the sample poll.

The controller 23 is programmed to disregard monitored power draw (P) values in excess of the predetermined ground contact power draw value ($P_{gc}$) until after a predetermined motor current in-rush time ($T_{in\text{-}rush}$) has passed. For each application, this predetermined period of time ($T_{in\text{-}rush}$) is set to be long enough to encompass an in-rush of whatever jack motor 14 the controller 23 is to monitor by measuring the motor current in-rush times of a suitably large sample of motors of the type to be used in a target application. Motor current in-rush is an extremely large spike in current draw that occurs immediately after activating a DC electric motor while coils of the motor are energizing. The motor in-rush time ($T_{in\text{-}rush}$) is slightly longer than the known brief period of time that it takes for this phenomenon to pass. The motor current in-rush time to be used by the device 20 is set to be longer than the worst case (longest) in-rush time measured, to account for motors outside the sample pool that may have longer in-rush times. In this way, the controller 23 causes the device 20 to ignore power spikes unrelated to ground contact.

The controller 23 is also programmed to wait a period of time before recognizing monitored power draw (P) values in excess of the predetermined ground contact power draw value ($P_{gc}$) as representing ground contact. In other words, this period of time, known as the motor load confirmation debounce period ($T_{load}$), represents the amount of time that the motor 14 must continue to draw more than the ground contact power draw value ($P_{gc}$ or $P_{threshold}+\Delta P_{load}$) before the controller 23 will conclude that ground contact has occurred. The controller 23 uses the $T_{load}$ parameter to prevent false ground contact detections that are caused by brief periods of motor load exceeding $P_{threshold}+\Delta P_{load}$. Such short term loads will pass unnoticed if they are shorter than the motor load confirmation debounce period ($T_{load}$). The $T_{load}$ parameter is also used to ensure that a jack 12 is firmly seated on the ground and to ensure that platform 10 weight has shifted onto the jack 12. This is accomplished by continuing to drive the jack 12 for a brief period after ground contact has been established. The value of the $T_{load}$ parameter is set taking into account the behavior of a target motor 14 over a wide variety of control voltages, platform loads, and ground conditions.

To arrive at the threshold power draw value $P_{threshold}$, the controller 23 is programmed to start with a previously-measured no-load power draw value and then dynamically adjusts that value to compensate for changes in jack motor 14 power draw that occur over time as a result of such factors as drive component wear, expansion and contraction of jack 12 and motor components due to temperature changes, contamination of jack 12 and motor components, loss of lubrication, corrosion, and the like. The controller 23 also dynamically adjusts threshold power draw value ($P_{threshold}$) to compensate for changes that occur between uses due to variations in environmental conditions.

In practice, the motor load confirmation debounce period ($T_{load}$), the motor current in-rush time ($T_{in\text{-}rush}$), and the minimum power draw increase ($\Delta P_{load}$) of the electric jack motors for the intended application are predetermined and stored in the device 20. It's preferable to store these parameters in non-volatile reprogrammable memory 31 such as EEPROM to allow the parameters to be updated to reflect more accurate or recent calculations, or changed to adapt to different applications or conditions. This allows the latest parameter values to be programmed into the product at the end of the production line and/or modified after the product is built. This method is typically implemented on new products where it's advisable to allow for parameter changes that may be implemented during early production. It's also useful to implement this method during the development phase of a product, when parameters are being determined and change daily. However, some or all of the parameters may alternatively be hard-coded into program ROM. This is a lower cost solution that may be implemented on mature products for which parameter values have not changed for a long period of time and are not expected to change in the near future.

The device 20 is then incorporated into a mobile platform attitude adjustment system 22. The attitude adjustment system 22 incorporating the device 20 is then mounted on the platform 10 and the device 20 is electrically connected to each of the motor-driven jacks 12 mounted around the platform 10. More specifically, the sensor leads 21 and the control leads are connected between the device 20 and each of the jacks 12 and the power lead is connected to the source of electrical power 26.

Figure 9:
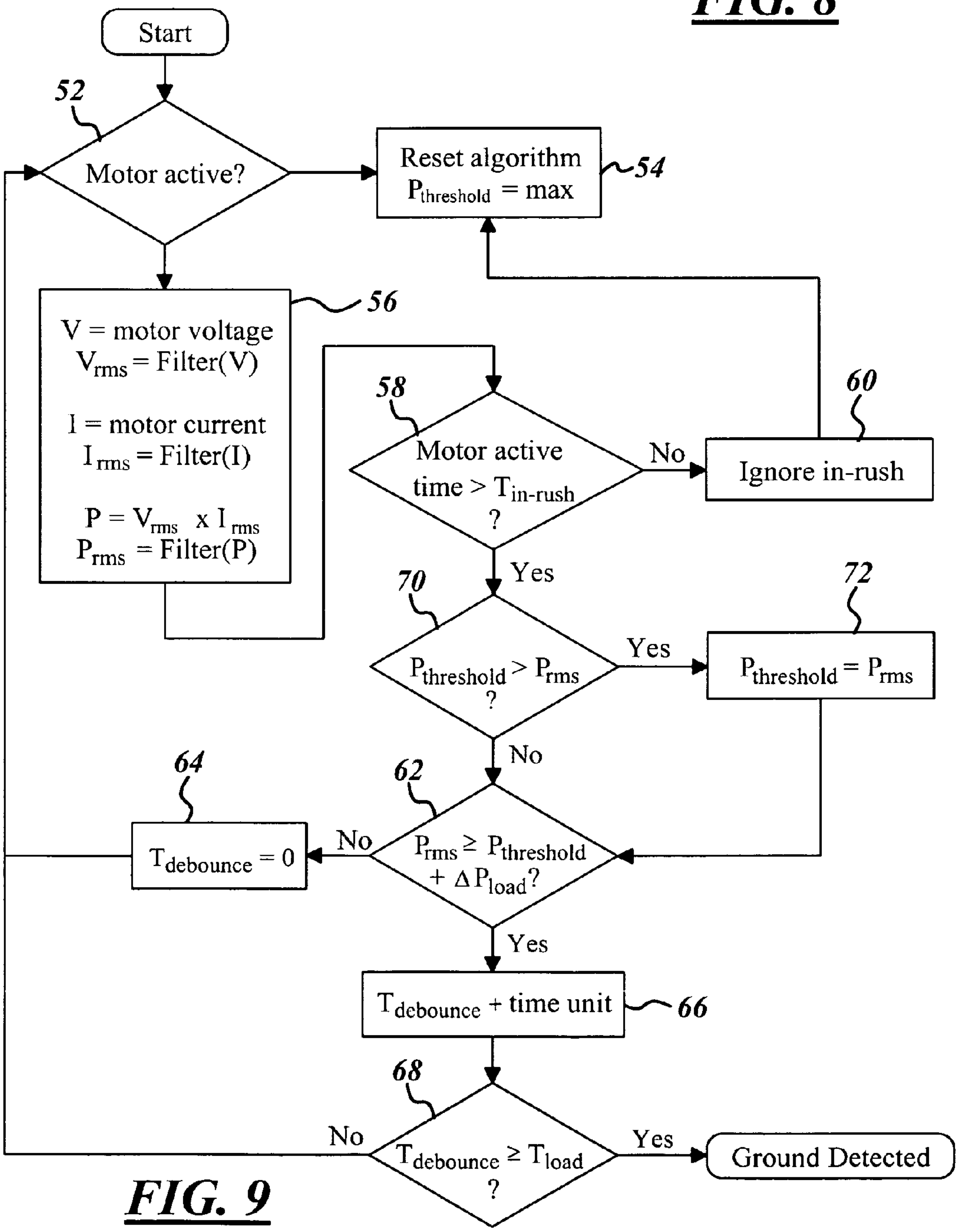
FIG. 9 is a flow chart showing an example of a jack grounding detection method implemented by the platform attitude adjustment device of FIG. 1.

When an operator actuates the attitude adjustment system 22 to begin adjusting the attitude of the platform 10, as shown at decision point 52 in FIG. 9, the controller 23 first determines whether the motor is active. If not, as shown at action point 54 and as is further explained below, the controller resets the value of $P_{threshold}$ to a maximum value. If the motor is active, the controller 23 begins to monitor the present electrical power draw value (P) of each of the electric jack motors, as shown at action point 56, while the electric jack motors are extending their respective associated extendable feet to adjust the attitude of the mobile platform 10. More specifically, and as is also shown at decision point 56, the controller 23 monitors and measures the present DC voltage (V) driving each of the electric jack motors as well as the respective present current draws (I) of the electric jack motors. The controller 23 then filters each of the DC voltage measurements into respective stable RMS voltage values ($V_{rms}$=RMS(V)) using a cutoff frequency set appropriately for the application and filters the current draw measurements into respective stable RMS current values ($I_{rms}$=RMS(I)) using a cutoff frequency set appropriately for the application. The controller 23 calculates the present electrical power draw (P) of each motor 14 by multiplying its stable RMS voltage value ($V_{rms}$) by its stable RMS current value ($I_{rms}$) according to the equation $P=V_{rms}\times I_{rms}$. The controller 23 also filters the resulting present electrical power draw (P) of each jack 12 into a stable RMS power value ($P_{rms}$) according to the equation $P_{rms}$=RMS(P) using a cutoff frequency set appropriately for the application.

As shown at decision point 58 and action point 60, the controller 23 ignores the present electric jack power draw values (P) that it monitors during a motor in-rush period defined as being the period of time between a motor actuation time and the motor current in-rush time ($T_{actuation}<T_{in\text{-}rush}$) and resets corresponding RMS measurements accordingly. During the in-rush period the controller 23 also sets the no-load threshold or baseline power draw values ($P_{threshold}$) for the electric jack motors to maximum expressible value for those variables as shown at action point 54 and, until the in-rush period is over, aborts the ground contact detection process. Once the in-rush period is over, the baseline power draw values ($P_{threshold}$), having been set to maximum expressible values, will necessarily be larger than any of the RMS jack power draw values ($P_{rms}$) measured immediately following the in-rush period. As shown at decision point 70 and action point 72, this insures that the controller 23 will initially set the baseline power draw values to equal the respective initial RMS jack power draw values experienced following the in-rush period. The controller 23 then adds the no-load threshold power draw value ($P_{threshold}$) of each electric jack motor 14 to the power draw increase or "delta" value ($\Delta P_{load}$) of the electric jack motors as shown at decision point 62 to arrive at initial stored ground contact power draw values ($P_{gc}$) for the respective electric jack motors.

While the jacks 12 continue to extend the extendable foot portions 30 of their respective associated jacks 12 following the motor in-rush period, and as the controller 23 continues to filter the present electric power draw values (P) of the electric jack motors, the controller 23 continuously compares the present electric jack motor RMS power draw values ($P_{rms}$) of the electric jack motors to the stored ground contact power draw value ($P_{gc}$) as shown at decision point 62. If, during this time following the in-rush period, the controller 23 senses that the present RMS power draw value ($P_{rms}$) of any jack 12 is less than the sum of the threshold power draw value and the power draw increase value ($P_{rms}<P_{threshold}+\Delta P_{load}$) the controller 23 resets the variable debounce confirmation timer value ($T_{debounce}$) for that jack 12 to zero as shown at action point 64. If, on the other hand, the controller 23 senses that the present RMS power draw value ($P_{rms}$) of a jack 12 is greater than the sum of the threshold power draw value and the power draw increase ($P_{rms}>P_{threshold}+\Delta P_{load}$), the debounce confirmation timer value ($T_{debounce}$) for that jack 12 increments by an appropriate time unit as shown at action point 66. Whenever the present RMS power draw value ($P_{rms}$) of one of the jacks 12 exceeds the sum of the threshold power draw value of that jack 12 and the predetermined power draw increase value ($P_{rms}>P_{threshold}+\Delta P_{load}$) long enough for that jack's debounce confirmation timer value ($T_{debounce}$) to increment to a value exceeding the motor load confirmation debounce period ($T_{debounce}>T_{load}$) as shown at decision point 68, the controller 23 will recognize that the extendable foot portion 30 of that jack 12 has contacted the ground. In response to ground contact recognition, the controller 23 produces a corresponding output signal to the attitude adjustment system 22 indicating that ground contact has occurred for that jack 12.

As each jack 12 is extending it's associated extendable foot portion 30 to adjust the attitude of the mobile platform 10, but before the foot portion 30 of each jack 12 contacts the ground, the controller 23 is dynamically updating the threshold power draw value ($P_{threshold}$) for each jack motor 14 by continuously re-measuring the power draw of each jack motor 14 and comparing it to whatever the current threshold power draw value ($P_{threshold}$) is as shown at decision block 70. The controller 23 dynamically adjusts the threshold power draw value ($P_{threshold}$) for each jack motor 14 such that if the threshold power draw value is greater than the present jack power draw ($P_{threshold}>P_{rms}$) then the controller 23 resets the threshold power draw value ($P_{threshold}$) by decreasing it to equal the present jack power draw value ($P_{threshold}=P_{rms}$) as shown at action point 72. The controller 23 then adds the dynamically updated threshold power draw value ($P_{threshold}$) to the stored power draw increase ($\Delta P_{load}$) as shown at decision point 62 and as is described above. This insures that the $P_{threshold}$ value never becomes so large, due, e.g., to motor in-rush, as to prevent the controller 23 from sensing that the criteria have been met for establishing that ground contact has occurred. In other words, by decreasing the value of $P_{threshold}$, the controller 23 is able to detect ground contact once the $P_{rms}$ value is $P_{load}$ larger than the minimum $P_{rms}$ value measured before ground contact.

This description is intended to illustrate certain embodiments of the invention rather than to limit the invention. Therefore, it uses descriptive rather than limiting words. Obviously, it's possible to modify this invention from what the description teaches. Within the scope of the claims, one may practice the invention other than as described.

What is claimed is:

1. An electric jack ground contact detection device for detecting ground contact of an electric motor-driven jack as the jack is being extended to adjust the attitude of a mobile platform, the device comprising:

a controller configured to:

monitor the electrical power draw of an electric motor-driven jack while the jack is being extended for use in adjusting the attitude of a mobile platform;

recognize jack ground contact when the monitored power draw value exceeds a ground contact power draw value consistent with jack ground contact; and calculate the ground contact power draw value as equaling the sum of a dynamically-adjusted threshold power draw value associated with jack extension before ground contact and a power draw increase value equaling an amount of additional power that the jack is known to draw as a result of jack ground contact; and a jack motor power draw sensor connected to the controller and configured to sense electrical power drawn by a jack motor and to transmit a corresponding jack motor power draw feedback signal to the controller.

2. An electric jack ground contact detection device as defined in claim 1 in which the controller is further configured to calculate the ground contact power draw value as equaling the sum of the dynamically-adjusted threshold power draw value and a power draw increase value representing the smallest amount of additional power that the jack is known to draw as a result of jack ground contact.

3. An electric jack ground contact detection device as defined in claim 2 in which the controller is further configured to dynamically adjust the threshold power draw value to compensate for changes in jack motor power draw that occur over time.

4. An electric jack ground contact detection device as defined in claim 2 in which the controller is programmed to dynamically adjust the threshold power draw value from a previously-measured no-load power draw value.

5. An electric jack ground contact detection device for detecting ground contact of an electric motor-driven jack as the jack is being extended to adjust the attitude of a mobile platform, the device comprising:

a controller configured to monitor the electrical power draw of an electric motor-driven jack while the jack is being extended for use in adjusting the attitude of a mobile platform;

the controller being further configured to recognize jack ground contact only after the monitored power draw value has exceeded a ground contact power draw value consistent with jack ground contact for a predetermined period of time.

6. An electric jack ground contact detection device as defined in claim 5 in which the predetermined period of time is set long enough to encompass an in-rush period of a jack motor whose power draw the controller is monitoring.

7. A method for detecting ground contact of an electric motor-driven jack as the jack is being extended to adjust the attitude of a mobile platform, the method including the steps of:

providing an electric motor-driven jack on a mobile platform;

predetermining and storing a ground contact power draw value known to be generally equal to the power draw of the jack once the jack has contacted the ground while extending to adjust the attitude of the platform;

monitoring a present electrical power draw value of the jack while the jack is extending to adjust the attitude of the mobile platform;

comparing the present jack power draw value to the stored ground contact power draw value while the jack is extending;

recognizing ground contact of the jack as occurring when the present jack power draw value equals or exceeds the stored ground contact power draw value; and calculating the stored ground contact power draw value by predetermining a threshold power draw value of the electric jack motor known to result from extension of the jack without encountering an obstruction, predetermining a power draw increase value of the jack known to result from ground contact of the jack, and adding the power draw increase value to the threshold power draw value.

8. The method of claim 7 in which the step of monitoring a present electrical power draw value of the jack includes:

measuring the DC voltage driving the jack;

measuring the current draw of the jack; and calculating the power draw of the motor as the product of the DC voltage driving the jack and the current draw of the jack.

9. The method of claim 7 in which the step of monitoring a present electrical power draw value of the jack includes:

filtering the DC voltage measurement into a stable RMS value; and filtering the current draw measurement into a stable RMS value.

10. The method of claim 7 in which the step of monitoring a present electrical power draw value of the jack includes filtering the power draw into a stable RMS value.

11. The method of claim 7 in which the step of monitoring a present electrical power draw value of the jack includes:

determining and storing a motor current in-rush period; and ignoring the measured power value during the motor in-rush period.

12. The method of claim 7 in which the step of recognizing ground contact of the jack includes:

resetting a debounce confirmation timer value to zero if the present jack power draw value is less than the sum of the threshold power draw value and the power draw increase; and incrementing the debounce confirmation timer value by an appropriate time unit if the present jack power draw value is greater than the sum of the threshold power draw value and the power draw increase.

13. The method of claim 7 in which the step of recognizing ground contact of the jack includes:

determining a motor load confirmation debounce period; and determining that jack ground contact has occurred in response to:

a present jack power draw value that exceeds the sum of the threshold power draw value and the power draw increase value, and a debounce confirmation timer value that exceeds the motor load confirmation debounce period.

14. The method of claim 7 in which the step of calculating the stored ground contact power draw value includes:

dynamically updating the threshold power draw value by:

re-measuring the power draw of the jack as it is extending to adjust the attitude of the mobile platform before ground contact, and resetting the threshold power draw value to equal the present jack power draw value; and adding the dynamically updated threshold power draw value to the stored power draw increase value.

15. The method of claim 7 in which the step of calculating the stored ground contact power draw value includes predetermining a minimum power draw increase of the jack known to result from ground contact of the jack.

* * * * *